Aug. 8, 1961  C. E. PETERSON  2,995,386
COLLAPSIBLE TOWING STRUCTURE FOR VEHICLES
Filed Nov. 23, 1959

INVENTOR.
Clyde E. Peterson
BY
Hovey, Schmidt, Johnson & Hovey
ATTORNEYS.

United States Patent Office 2,995,386
Patented Aug. 8, 1961

2,995,386
COLLAPSIBLE TOWING STRUCTURE
FOR VEHICLES
Clyde E. Peterson, Morganville, Kans.
Filed Nov. 23, 1959, Ser. No. 854,887
5 Claims. (Cl. 280—491)

This invention relates to towing apparatus and particularly to a unit adapted to be mounted on a truck or the like so that the latter may be towed behind a tractor from one point to another.

Farmers have found it advantageous in recent years to tow a pickup truck or similar vehicle, behind a tractor when the latter is driven to a field so that the truck is available for trips back to the house or into town when desired or necessary without the necessity of driving the tractor back to the barn to pick up the truck. This practice is especially prevalent in areas having farms of relatively large size wherein it is an extended distance from the field being worked back to the house, and especially where it is desirable to leave the tractor in the field overnight because the work in that particular area cannot be accomplished in one day. It can be recognized that considerable time is saved in having a truck available, not only because the same can be used, if desired, in the field, but further, the same is always available when needed.

A further note is the fact that the truck and tractor can be both taken to the field by one operator, yet both vehicles are at hand for use as needed.

Towing apparatus for use on vehicles has been previously provided, but the same have been so expensive and cumbersome that many farmers have not used the same even though the advantageous procedure outlined above could be carried out because of the work involved in mounting and de-mounting the towing structure between towing operations, or the fact that the towing attachment interfered with normal operation of the truck.

It is, therefore, the primary object of the present invention to provide a towing attachment for trucks or other vehicles, permitting the truck to be pulled behind a tractor, but of construction whereby the towing unit may be collapsed into a readily accessible position which does not in any way interfere with general usage of the vehicle, and furthermore, does not detract from the appearance thereof.

Another significant object of the invention is to provide towing structure as defined above, which may be quickly and easily mounted on either the bumper struts or front frame members of the truck and yet which may be left thereon during normal use of the truck without interfering with operation thereof, and which may be quickly moved to an extended position for towing purposes whenever desired.

A further significant object of the instant invention is to provide towing apparatus which, although simple in construction and, therefore, relatively inexpensive, has high strength characteristics and thereby a long useful life without frequent maintenance or repair being required.

Also, another important object of the invention is to provide towing apparatus having a pair of swingable members movable to positions presenting a towbar and which are swingable about both vertical and horizontal axes to permit storing of the members in a collapsed condition which does not take up an excessive amount of space proximal to the bumper of the vehicle, and furthermore, does not present a safety hazard during normal utilization of the truck.

Other important objects and details of construction of the present towing structure will become obvious or be explained in greater detail as the following specification progresses.

In the drawing:

FIG. 1 is a fragmentary plan view of towing structure embodying the principles of the present invention illustrated in an extended position and shown mounted on the front bumper of a vehicle or the like;

Figure 1:
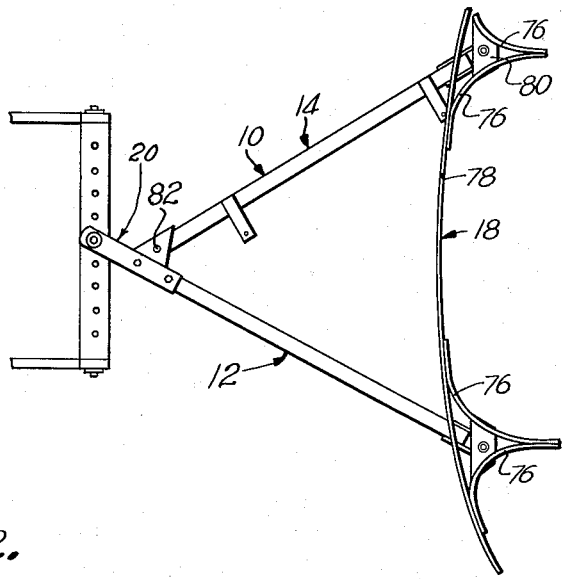

Towing structure broadly designated 10, is illustrated in the drawing in its preferred form and includes as basic components, a first towing component 12, a second towing component 14, mounting mechanism 16 swingably securing one end of each of the components 12 and 14 to bumper means 18 forming a part of the vehicle upon which structure 10 is adapted to be mounted, and combination hitch and connector means 20 at opposite ends of the components 12 and 14 for interconnecting the same and permitting releasable coupling of structure 10 to a tractor or the like.

Figure 3:
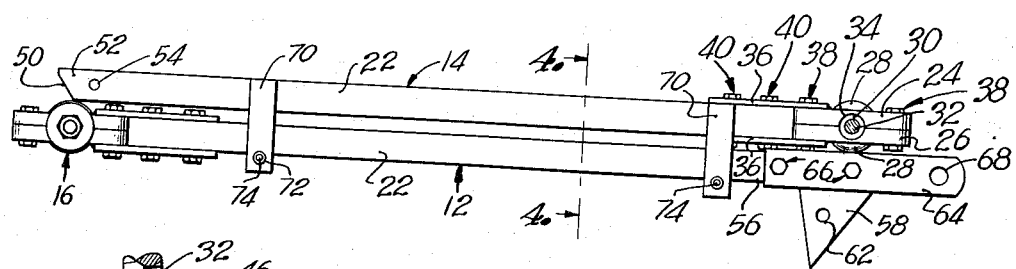
FIG. 3 is an enlarged plan view of the present towing structure and illustrating the same in a collapsed condition.
Figure 4:
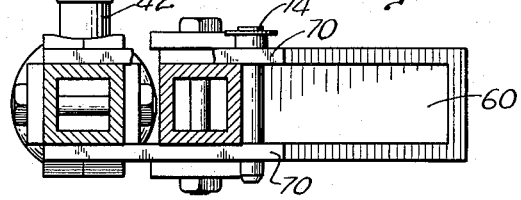
FIG. 4 is an enlarged, fragmentary, vertical, cross-sectional view taken on line 4—4 of FIG. 3 and looking in the direction of the arrows.

Each of the components 12 and 14 includes an elongated, tubular, transversely square member 22. Mounting mechanism 16 at corresponding ends of each of the members 22, includes a pair of plates 24 and 26 provided with a central, substantially hemispherically configured segment 28 with opposed segments 28 cooperating to present a spherical chamber pivotally receiving a ball 30 having a stem 32 connected thereto. As indicated in FIG. 3, each of the plates 24 and 26 of each mounting mechanism 16, has semi-circular notches 34 therein for clearing a respective stem 32 and permitting limited movement thereof in any direction as ball 30 pivots between respective segments 28.

Opposed mounting members 36 welded to respective plates 24 and 26 and extending outwardly therefrom in the same direction, are parallel with the outer faces of plates 24 and 26 and are spaced apart a distance to complementally receive a respective member 22 therebetween. A pair of bolt and nut means 38 extending through plates 24 and 26 on opposed sides of segments 28, and through mounting members 36 adjacent corresponding members 22, serve to releasably interconnect opposed plates 24 and 26. Another pair of bolt and nut means 40 passing through mounting members 36, as well as the proximal end of a member 22, releasably connect the latter to a corresponding mounting mechanism 16.

Figure 2:
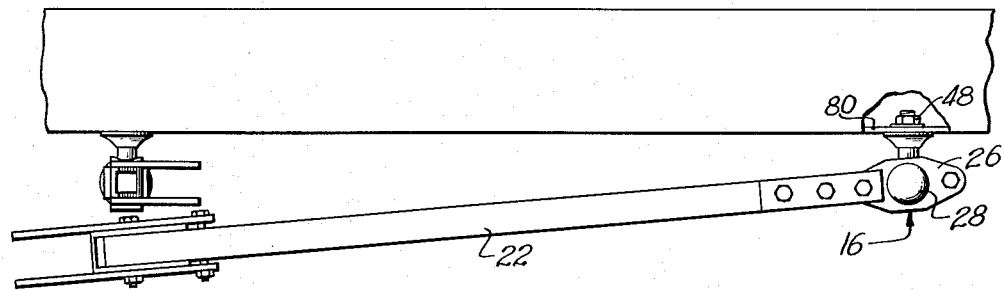
FIG. 2 is an enlarged, fragmentary, front elevational view of the instant towing structure showing one member in substantial parallelism with the bumper, while the other member is in generally perpendicular relationship to the bumper and the opposed member.

A cylindrical collar 42 surrounding stem 32, and abutting ball 30, maintains generally frusto-conical spacer element 44 in predetermined spaced relationship from plates 24 and 26. The upper extremity of stem 32 extending above the annular, relatively flat surface 46 of element 44, is externally threaded to receive a lock nut 48 as best shown in FIG. 2.

The outer extremity of member 22 of component 14, away from mounting mechanism 16 therefor, is beveled as at 50 to present an edge adapted to complementally engage the outer opposed face of member 22 of component 12. The end 52 of member 22 of component 14, having beveled edge 50, is also provided with a pair of aligned openings 54 therein for receiving pin means to be hereinafter defined.

The extremity 56 of member 22 of component 12 mounts hitch means 20 and which includes a pair of generally triangular-shaped members 58 welded to opposed, normally upper and lower faces of end 56 of the respective members 22 with angularly disposed end wall 60 welded to opposed angular margins of members 58 serving as stop means for extremity 52 of the other member 22 as will be hereinafter specified. Note that end wall 60 is located away from connector mechanism 16 secured to the corresponding member 22. Members 58 also have opposed openings 62 therein adapted to be aligned with openings 54 when extremity 52 of the corresponding member 22 is within the triangular socket presented by members 58 and end wall 60.

A pair of opposed, parallel, longitudinally aligned hitch straps 64 are bolted to opposite sides of member 22 of component 12 in overlying relationship to opposed members 58 and secured to extremity 56 of the corresponding member 22 by a pair of opposed bolt and nut means 66 extending therethrough. The outer ends of straps 64 are provided with vertically aligned openings 68 therein for receiving the hitch pin of the tractor or the like.

Member 22 of component 14 has two pairs of laterally projecting extensions 70 welded to opposite upper and lower faces of the corresponding member 22, and extending outwardly in a direction to receive the opposite member 22 therebetween. The outer extremities of extensions 70, away from the member 22 on which the same are mounted, have aligned openings 72 therein for receiving respective pins 74.

In utilization of towing structure 10, members 22 of components 12 and 14 may be connected either to the forward ends of the frame of the vehicle or to the spring bracket members 76 provided for mounting bumper 78 on the vehicle frame. One convenient method of mounting is illustrated in FIG. 1, wherein a pair of opposed, parallel, horizontal bracket plates 80 are welded to corresponding bracket members 76 in spanning relationship thereto. Each of the bracket plates 80 has an opening therein for clearing the upper ends of respective stems 32, whereby, when nuts 48 are threaded onto corresponding stems 32, components 12 and 14 are securely affixed to corresponding bracket plates 80. Assuming that components 12 and 14 are in the collapsed condition thereof with extensions 70 receiving member 22 of component 12 therebetween, and with pins 74 positioned within openings 72 and extensions 70, it can be seen that towing structure 10 is out of the way below bumper 78 and does not interfere with normal operation of the vehicle. Furthermore, bumper 78 performs its normal function of protecting the front part of the vehicle, while towing structure 78 is merely supplementary in this respect.

When it is desired to tow the vehicle by a tractor or the like, it is only necessary to remove pins 74 from respective extensions 70, followed by swinging of component 14 outwardly about the axis of stem 32 of the respective mounting mechanism 16. It is to be understood that ball 30 pivots within opposed segments 28 of plates 24 and 26 to thereby permit swinging movement of member 22 of component 14 about a vertical axis. After component 14 has been swung outwardly, component 12 is grasped and simultaneously swung outwardly and downwardly as ball 30 in the respective mounting mechanism 16, permits member 22 thereof to pivot about both horizontal and vertical axes. When the outer end of component 12 clears the outer extremity of component 14, hitch means 20 is moved toward extremity 52 of member 22 of component 14 until extremity 52 is complementally received within the socket defined by triangular plates 58 and end wall 60.

Next, a pin 82 is passed through aligned openings 62 and 54 to thereby releasably interconnect components 12 and 14. By placing the tractor hitch pin through the tow bar of the tractor, as well as openings 68 in straps 64, the vehicles may be readily towed by the tractor.

Collapsing of towing structure 10 may be readily accomplished by a procedure exactly reverse to that described above.

The utilization of ball and socket mounting mechanism 16 for each of the components 12 and 14 is an important feature of the instant towing structure by virtue of the fact that this construction permits collapsing of the tow members 22 in an overlapped condition, and yet allows the same to be moved into their extended locations by virtue of the fact that at least one of the members may be pivoted about both vertical and horizontal axes to a position clearing the other towing member.

Furthermore, the mounting mechanism as illustrated and described, permits towing structure 10 to be readily secured to the front of the vehicle in a minimum of time and without extensive modification of the vehicle and particularly, the frame thereof being required. Not only is towing structure 10 inexpensive and of great structural strength, but the same need not be removed from the vehicle after each towing operation in order to utilize the truck for other purposes.

Although ball and joint mechanism 16 has been illustrated and described for swingably securing one end of each of the components 12 and 14 to bumper means 18, it is to be recognized that conventional universal joint structure may be employed wherein the joint has a pair of swingably interconnected units which are pivotable about perpendicular axes. Other changes such as this can be made in the present towing structure without departing from the scope of the invention and it is therefore desired to be limited only by the scope of the appended claims.

Having thus described the invention what is claimed as new and desired to be secured by Letters Patent is:

1. In towing apparatus, a first elongated member; a first coupling device on one end of said first member and adapted to be secured to the bumper structure of a vehicle to be towed, for mounting said first member on the structure for movement about a substantially vertical axis; a second elongated member; a second coupling device on one end of said second member and adapted to be secured to said bumper structure in horizontally spaced relationship to said first device for mounting said second member on said structure for movement about intersecting, substantially vertical and horizontal axes, said devices being disposed on a first line substantially perpendicular to the direction of forward movement of said vehicle, said members being movable into extended locations forwardly of said bumper structure with the opposite end of said first member being releasably interconnected with said second member proximal to the opposite end of the latter when said members are in an operative position, said members being shiftable from said operative position to a retracted position with said second member being disposed rearwardly of said first device along a second line inclined relative to and substantially coplanar with said first line and said first member being disposed along a third line forwardly of and parallel with said second line; and bracket means on said first member intermediate the ends thereof, extending rearwardly therefrom and positioned to receive said second member in overlapping relationship thereto when said members are disposed in said retracted position, said bracket means being releasably secured to said second member for maintaining said members in said retracted position.

2. In towing apparatus as set forth in claim 1, wherein each of said members is tubular and transversely polygonal.

3. In towing apparatus as set forth in claim 1, wherein said second member is of a length greater than the distance betwen said devices, said second member is moved downwardly about the horizontal axis of said second device and moved rearwardly about the vertical axis of said second device when said second member is moved to the retracted position from said operative position.

4. In towing apparatus as set forth in claim 1, wherein the point of interconnection between said first and second members when the latter are in said operative position and the opposite end of said second member are on a line substantially bisecting the angle between said members.

5. In towing apparatus as set forth in claim 1, wherein said bracket means comprises a U-shaped bracket adapted to receive therewithin said second member and pin means on said bracket for maintaining said second member within said bracket when said members are in said retracted position.

References Cited in the file of this patent

UNITED STATES PATENTS

| | | |
|---|---|---|
| 1,033,696 | Hilliard | July 23, 1912 |
| 2,139,970 | Moore | Dec. 13, 1938 |

FOREIGN PATENTS

| | | |
|---|---|---|
| 675,058 | France | Feb. 5, 1930 |
| 536,320 | Great Britain | May 9, 1941 |